(No Model.)
J. W. THOMPSON.
GOVERNOR.
No. 385,535. Patented July 3, 1888.
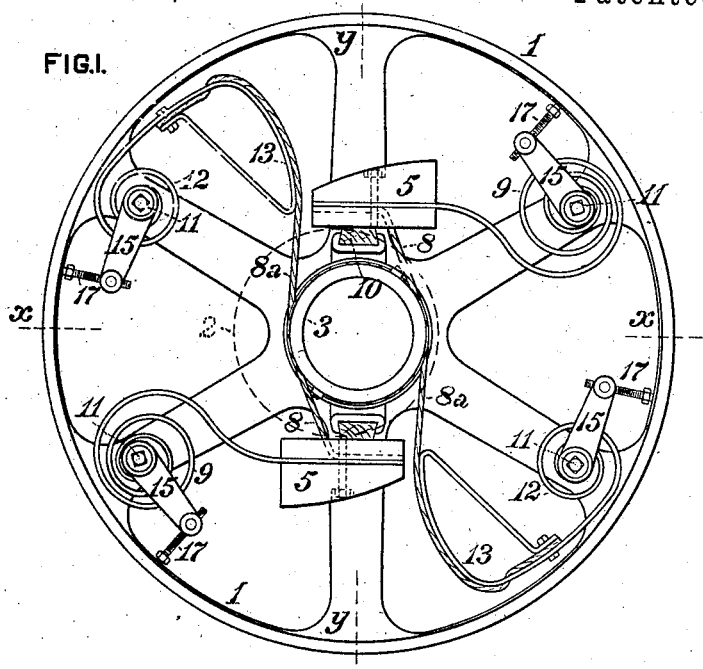
FIG.1.
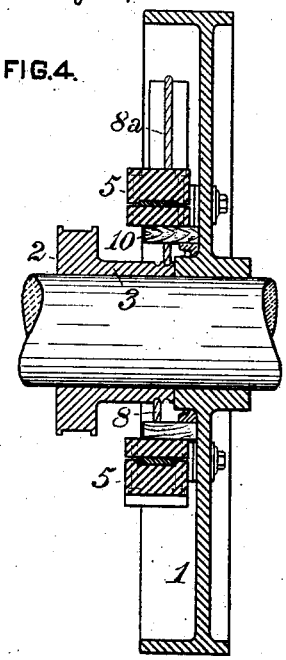
FIG.4.
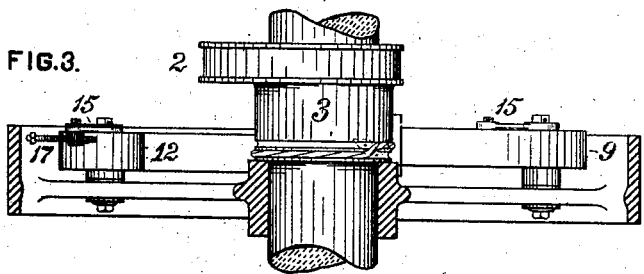
FIG.3.
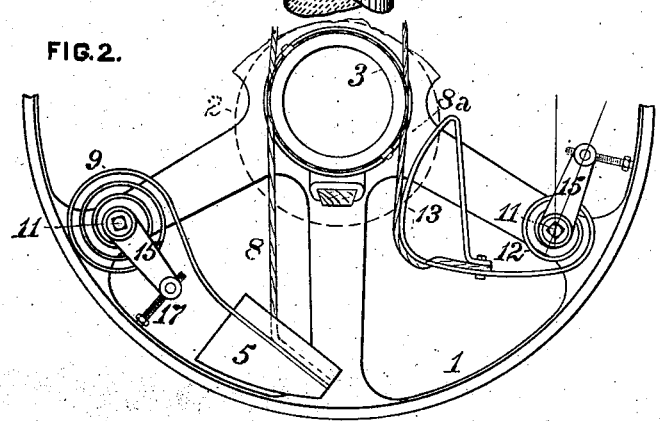
FIG.2.
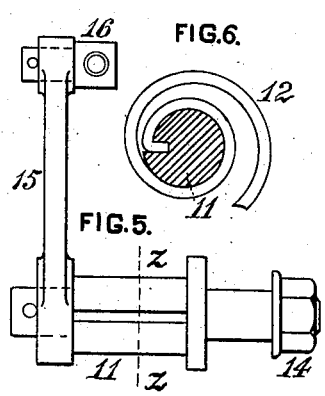
FIG.6.
FIG.5.
WITNESSES:
R. H. Whittesey.
F. E. Gaither.
INVENTOR,
Jas. W. Thompson
by J. Snowden Bell
Att'y.

UNITED STATES PATENT OFFICE.

JOSEPH W. THOMPSON, OF COLUMBIANA, ASSIGNOR OF ONE-HALF TO THE BUCKEYE ENGINE COMPANY, OF SALEM, OHIO.

GOVERNOR.

SPECIFICATION forming part of Letters Patent No. 385,535, dated July 3, 1888.

Application filed March 1, 1888. Serial No. 265,857. (No model.)

*To all whom it may concern:*

Be it known that I, JOSEPH W. THOMPSON, of Salem, in the county of Columbiana and State of Ohio, have invented a certain new and useful Improvement in Governors, of which improvement the following is a specification.

My invention relates to centrifugal governors of the class adapted to be mounted upon the crank-shaft of an engine and to effect regulation by variation of position of a valve-operating eccentric; and its object is to simplify and economize the construction and maintenance of a governor of such character, as well as to dispense with pivotal connections or other wearing-surfaces involving friction and requiring lubrication other than the bearing of the movable eccentric.

To this end my invention, generally stated, consists in the combination of a supporting-case, a spring connected thereto, a movable eccentric, and a weight secured to the spring and coupled by a flexible connection to the eccentric; also, in the combination of a supporting-case, a movable eccentric, a weight coupled by a flexible connection to said eccentric and secured to a spring fixed to the case, and a supplemental spring connected to the weight and to the case and exerting tension upon the weight in corresponding direction with the primary spring; also, in the combination of a supporting-case, a movable eccentric, a spring fixed to the case, a weight connected to the spring and to the eccentric, and a device for adjusting the tension of the spring.

The improvement claimed is hereinafter fully set forth.

In the accompanying drawings, Figure 1 is a view in elevation of a governor embodying my invention, the weights being shown at the inner limit of their range of movement, and the eccentric being removed and its position indicated by a dotted line; Fig. 2, a similar view of one-half of the same, showing the weight at the outer limit of its range of movement; Figs. 3 and 4, transverse sections at the lines $x\,x$ and $y\,y$, respectively, of Fig. 1; Fig. 5, a view in elevation and on an enlarged scale of one of the spring studs with its attached adjusting-arm; and Fig. 6, a transverse section through the same at the line $z\,z$ of Fig. 5, showing a portion of an attached spring.

A case or wheel, 1, which may be of any suitable form adapted to be fixed upon the main or crank shaft of the engine, or upon a separate shaft rotating coincidently therewith, serves, as in former constructions of the same general type, as the support of the mechanism by which movement is imparted to the valve-operating eccentric 2, which is cast with or secured to a sleeve or tubular hub, 3, fitting freely upon the shaft to which the case 1 is fixed. The required changes of angular position of the eccentric 2 are effected by the movements of a pair of weights, 5, as the same are actuated in opposite directions, respectively, by centrifugal force and by spring-tension. Each of the weights 5 is rigidly connected to a spring, 9, which is in turn secured to a stud, 11, fixed to the case, and is also coupled to the hub 3 of the eccentric 2 by a wire rope or other suitable flexible connection, 8, passing around and resting in a circumferential groove in the hub. The springs 9 are preferably of spiral form, as shown, the lead of the spirals being in such direction that the tension of the springs shall be exerted in opposition to the outward traverse of the weights; but the springs may, if preferred, be otherwise constructed—as, for example, in helical coils having projecting ends or arms for connection to the weights.

In the case of governors which are fixed upon vertical shafts the employment of a single centripetally-acting spring in connection with each of the centrifugally-acting weights will be found to sufficiently and properly effect the desired changes of angular position of the governor; but where, as is in most instances the case, the governor-shaft rotates in a horizontal plane, the addition of a secondary or supplemental spring becomes necessary to eliminate any disturbing action due to gravity, and further affords a desirable application of centripetal force. To this end two supplemental springs, 12, are secured to studs 11, fixed at diametrically opposite points to the case 1, similarly to the studs 11 of the primary springs 9, said springs being of substantially similar form to said primary springs and acting by their tension in the same direction upon the respective weights. Each supplemental spring 11 is coupled by a flexible connection, 8ª, to the hub 3 of the eccentric, the flexible connection passing around the hub in a groove adjoining that which receives the flexible connection 8 of the weight upon which the tension of the supplemental spring is to be exerted with the hub 3 of the eccentric. The connections 8 and 8ª are secured to the hub at the same point by a pin or stud; or, if preferred, the connection which couples the weight to the hub and supplemental spring may be integral, such connection being fixed to the hub at a point corresponding with the meeting-point of the connections 8 and 8ª, and extending therefrom around the hub in different directions and in each of two adjacent grooves to the weight and to the supplemental spring, respectively. The connections of the respective weights in such case lie in alternately opposite portions of the adjacent hub-grooves, crossing from one to the other, so as to avoid interference in their movements. Curved guides or seats 13 may be fixed to the free ends of the supplemental springs to properly lead the connections 8ª therefrom to the hub of the eccentric.

The operation of the governor will be clearly apparent from Figs. 1 and 2. The outward movements of the weights 5 under the influence of centrifugal force turn the eccentric 2 from the position shown by the dotted line in Fig. 1 to that similarly indicated in Fig. 2, such movements of the weights being opposed by the tension of the primary and supplemental springs, which, proportionately to the diminution of centrifugal force, moves the eccentric in the opposite direction. It will be seen that all pivotal connections are dispensed with and that the only wearing-surface at which friction exists in operation, and which consequently requires lubrication, is the bearing of the eccentric-hub upon the shaft.

The tension of the springs may be varied and adjusted, as from time to time desired, in the following manner: The studs 11, to which the ends of the primary and supplemental springs are connected, are held longitudinally in position upon the case 1 by nuts 14 engaging screw-threads on the studs, and adjusting-arms 15 are fitted upon the opposite ends of the studs by squared holes inclosing correspondingly-formed portions of the studs. Nuts 16, pivoted in the outer ends of the adjusting-arms, engage adjusting-screws 17, which bear upon the rim, and may be rotated to move the outer ends of the adjusting-arms 15 toward the center of the case, thereby increasing, as desired, the tension of the springs by effecting corresponding degrees of axial movement of the studs 11 in their sockets in the case. To increase as far as practicable the range of adjustment of the springs and admit of the same being made without the use of unduly long adjusting-screws, the squared projections which carry the adjusting-arms are preferably so set that the diagonals of their squares diverge by about twenty-two and one-half degrees from the center lines of the arms, as indicated in Fig. 2. By such construction, if the range of adjustment permitted by the length of the adjusting-screw should be exhausted in effecting an increase of tension, the stud 11 may be held fast in its socket by tightening its nut 14 and the adjusting-arm taken off, turned over, and replaced upon the stud, the two sides of the arm being made alike for this purpose. In such adjustment the inner end of the arm will then be brought nearer to the rim of the case by a distance measured by an angle of forty-five degrees, and a corresponding range of further adjustment will be admitted of. A further range of forty-five degrees of adjustment may be thereafter obtained, if desired, by again tightening the stud, removing and turning over the arm, and replacing it on the squared portion of the stud at a different inclination. The range of adjustment may thus be renewed after each traverse of the arm through an arc of forty-five degrees, whereas if the sides of the squared hole in the arm were parallel with or at an angle of forty-five degrees to the center line of the arm, the range could be renewed only after each traverse through an arc of ninety degrees, and correspondingly longer adjusting-screws would be required.

It will be obvious that adjustment of tension may, if preferred, be made without the employment of the adjusting-arm, pivoted nut, and adjusting-screw by applying a wrench to a square on the stud and clamping it in adjusted position by the nut on its end. The adjustment can, however, be effected with greater convenience and accuracy and the stud be held with greater security after adjustment by the employment of the construction above described.

I claim as my invention and desire to secure by Letters Patent—

1. In a centrifugal governor, the combination of a supporting-case, a movable eccentric, a spring connected to the case, and a weight secured to the spring and coupled by a flexible connection to the eccentric, substantially as set forth.

2. In a centrifugal governor, the combination of a supporting-case, a movable eccentric, a primary and a supplemental spring, each connected to the case and adapted to exert tension in the same direction, and a weight secured to the primary spring and coupled by a flexible connection to the eccentric and to the supplemental spring, substantially as set forth.

3. In a centrifugal governor, the combination of a supporting-case, a movable eccentric, a coiled spring secured to the case, a weight rigidly secured to a prolongation of said spring, and a flexible connection secured at one end to the weight and passing around the hub of the eccentric to a point at which it is rigidly secured thereto, substantially as set forth.

4. In a centrifugal governor, the combination of a supporting-case, a movable eccentric, a primary and a supplemental spring each secured to the case and coiled in the same direction, and a flexible connection which encircles the hub of the eccentric, and is secured thereto at one point in its length, and is secured at one end to the weight and at the other to the supplemental spring, substantially as set forth.

5. In a centrifugal governor, the combination of a supporting-case, a movable eccentric, a pair of primary and a pair of supplemental springs secured to the case, the springs of each pair exerting tension in opposite directions, respectively, a pair of weights, each rigidly secured to one of the primary springs, and a pair of flexible connections, each of which is secured at one end to one of the weights and at the other to the supplemental spring, whose tension acts in the same direction as that of the primary spring to which the weight is secured, each of said flexible connections encircling and being secured to the hub of the movable eccentric and passing alternately through two adjacent circumferential guide-grooves formed therein, substantially as set forth.

6. In a centrifugal governor, the combination of a supporting-case, a movable eccentric, a spring fixed to the case, a weight connected to the spring and coupled by a flexible connection to the eccentric, and an adjusting device for varying the tension of the spring, substantially as set forth.

7. In a centrifugal governor, the combination of a supporting-case, a movable eccentric, a spring stud fitted to be moved about its axis in a socket in the case, an adjusting-arm connected to the spring-stud, a nut pivoted to said arm, an adjusting-screw engaging said nut and bearing on the supporting-case, and a coiled spring connected to the spring-stud and to a weight which is coupled to the movable eccentric, substantially as set forth.

8. In a centrifugal governor, the combination of a supporting-case, a movable eccentric, a spring-stud fitted to be moved about its axis in a socket in the case and having a squared portion at one of its ends, an adjusting-arm which is similarly formed on both its sides and is provided with a squared hole the diagonal of which diverges at substantially one-quarter of a right angle from the center line of the arm and which is adapted to fit the squared portion of the spring-stud, a nut pivoted to the adjusting-arm, an adjusting-screw engaging said nut and bearing on the supporting-case, and a coiled spring connected to the spring-stud and to a weight which is coupled to the movable eccentric, substantially as and for the purpose set forth.

JOSEPH W. THOMPSON.

Witnesses:
HENRY C. JONES,
JAMES M. REED.

It is hereby certified that the residence of the patentee in Letters Patent No. 385,535, granted July 3, 1888, upon the application of Joseph W. Thompson, for an improvement in "Governors," was erroneously written and printed "Columbiana, Ohio," whereas said residence should have been written and printed *Salem, Ohio;* and that the said Letters Patent should be read with this correction therein that the same may conform to the record of the case in the Patent Office.

Signed, countersigned, and sealed this 10th day of July, A. D. 1888.

[SEAL.]
                                                        D. L. HAWKINS,
*Assistant Secretary of the Interior.*

Countersigned:

BENTON J. HALL,
*Commissioner of Patents.*